United States Patent
Xu et al.

(10) Patent No.: US 9,763,138 B2
(45) Date of Patent: Sep. 12, 2017

(54) LOAD BALANCING APPARATUS AND METHOD FOR WIRELESS COMMUNICATIONS SYSTEM, AND BASE STATION

(71) Applicants: Xiaodong Xu, Beijing (CN); Cuibo Yu, Beijing (CN); Yu Sun, Beijing (CN); Rui Gao, Beijing (CN); Liyao Wei, Beijing (CN); Xiandong Li, Beijing (CN)

(72) Inventors: Xiaodong Xu, Beijing (CN); Cuibo Yu, Beijing (CN); Yu Sun, Beijing (CN); Rui Gao, Beijing (CN); Liyao Wei, Beijing (CN); Xiandong Li, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/895,168

(22) PCT Filed: Sep. 28, 2014

(86) PCT No.: PCT/CN2014/087676
§ 371 (c)(1),
(2) Date: Dec. 1, 2015

(87) PCT Pub. No.: WO2015/043523
PCT Pub. Date: Apr. 2, 2015

(65) Prior Publication Data
US 2016/0135087 A1    May 12, 2016

(30) Foreign Application Priority Data
Sep. 29, 2013    (CN) .......................... 2013 1 0456549

(51) Int. Cl.
*H04W 72/00* (2009.01)
*H04W 28/08* (2009.01)
(Continued)

(52) U.S. Cl.
CPC .......... *H04W 28/08* (2013.01); *H04W 16/08* (2013.01); *H04W 36/04* (2013.01); *H04W 36/22* (2013.01); *H04W 36/30* (2013.01); *H04W 72/082* (2013.01)

(58) Field of Classification Search
CPC ..... H04W 28/08; H04W 28/16; H04W 16/08; H04W 72/082; H04W 36/04; H04W 36/22; H04W 36/30
(Continued)

(56) References Cited

U.S. PATENT DOCUMENTS 9,042,894 B2 * 5/2015 Zhou ................. H04W 36/20
370/237
9,060,289 B2 * 6/2015 Chandrasekhar ..... H04W 24/02
(Continued)

FOREIGN PATENT DOCUMENTS

| CN | 102333359 A | 1/2012 |
| CN | 102883328 A | 1/2013 |
| CN | 103220678 A | 7/2013 |

OTHER PUBLICATIONS

International Search Report Issued Jan. 6, 2015, for PCT/CN2014/087676 Filed Sep. 28, 2014.

*Primary Examiner* — Wayne Cai
(74) *Attorney, Agent, or Firm* — Oblon, McClelland, Maier & Neustadt, L.L.P.

(57) ABSTRACT

A load balancing apparatus and method for a wireless communications system, and a base station. The apparatus includes: an interference monitoring part, configured to monitor interference between small cells during load balancing; and a load balancing control part, configured to adjust load balancing according to the interference between the small cells that is monitored by the interference monitoring part.

15 Claims, 7 Drawing Sheets

(51) Int. Cl.
*H04W 16/08* (2009.01)
*H04W 72/08* (2009.01)
*H04W 36/04* (2009.01)
*H04W 36/22* (2009.01)
*H04W 36/30* (2009.01)

(58) Field of Classification Search
USPC .......... 455/438, 450, 451, 452.1–452.2, 453
See application file for complete search history.

(56) References Cited

U.S. PATENT DOCUMENTS

| | | | |
|---|---|---|---|
| 2013/0045741 A1 | 2/2013 | Martin et al. | |
| 2013/0344874 A1* | 12/2013 | Kim .................... | H04W 28/08 455/438 |
| 2014/0328182 A1* | 11/2014 | Gao .................... | H04W 28/08 370/236 |

* cited by examiner

LOAD BALANCING APPARATUS AND METHOD FOR WIRELESS COMMUNICATIONS SYSTEM, AND BASE STATION

FIELD

The disclosure generally relates to the field of wireless communication, and in particular to a device and method for load balancing in a wireless communication system, and corresponding macro base station and small base station.

BACKGROUND

A heterogeneous network proposed in LTE-A standard includes different types of base station nodes, which may include a macro base station and a small base station such as a micro base station and a home base station. A small cell is deployed, and the load of a micro cell may be alleviated in a case that a portion of traffic load is undertaken by the small cell. Moreover, a load balancing process may also be performed between adjacent small cells, to alleviate a case that loads of a portion of the small cells are too heavy. Network throughput can be increased by load balancing.

SUMMARY

A brief overview of the invention is given hereinafter to provide basic understanding to some aspects of the invention. It should be understood that, the overview is not an exhaustive overview of the invention and is not intended to determine a key or critical part of the invention or to limit the scope of the invention. Instead, the overview aims at presenting some concepts in a simplified form as a preface of a detailed description discussed later.

According to an embodiment of the invention, a device for load balancing in a wireless communication system is provided. The device includes: an interference monitoring unit configured to monitor interference between small cells caused by a load balancing process; and a load balancing control unit configured to adjust the load balancing process based on the interference between the small cells monitored by the interference monitoring unit.

According to another embodiment of the invention, a method for load balancing in a wireless communication system is provided. The method includes: monitoring interference between small cells caused by a load balancing process; and adjusting the load balancing process based on the monitored interference between the small cells.

According to yet another embodiment of the invention, an electronic apparatus for use in a macro base station side is provided. The electronic apparatus of macro base station side includes: an interference information acquisition device configured to acquire interference information, wherein the interference information includes information about interference on an adjacent small cell with respect to an unloading target cell caused by an unloading from the macro base station to a small cell; and a load balancing device configured to perform a load balancing process between small cells based on the interference information. Specifically, the electronic apparatus of macro base station side is the macro base station in some examples, and can be a processing component contained in the macro base station in other examples.

According to another embodiment of the invention, an electronic apparatus for use in a small base station side is provided, the electronic apparatus of small base station side includes: an interference information acquisition device configured to acquire interference information, wherein the interference information includes information about interference on an unloading object user from the present small cell after the unloading object user is unloaded from the present small cell to a target cell, or information about interference on the present small cell from an adjacent small cell resulting from the adjacent small cell accepting an unloading; and a load balancing device configured to perform a load balancing process with another small cell based on the interference information. Specifically, the electronic apparatus of small base station side is the small base station in some examples, and can be a processing component contained in the small base station in other example.

According to yet another embodiment of the invention, a computer storage medium is provided, on which a computer readable computer program code is recorded. When read and executed by a computer, the computer program code causes the computer to perform the following method: monitoring interference between small cells caused by a load balancing process; and adjusting the load balancing process based on the monitored interference between the small cells.

According to yet another embodiment of the invention, a device in a wireless communication system is provided. The device includes a memory and a processor. The memory is configured to store a computer instruction, and the processor is configured to perform the following method by executing the computer instruction stored in the memory: monitoring interference between small cells caused by a load balancing process; and adjusting the load balancing process based on the monitored interference between the small cells.

With the device and method for load balancing according to the embodiments of the invention, the load balancing process is adjusted based on the interference generated in the load balancing process, a problem that interference in a small cell is increased that may be caused by, for example, unloading of a macro cell and balancing between small cells can be avoided.

BRIEF DESCRIPTION OF THE DRAWINGS

The invention can be better understood by making reference to a description given hereinafter in conjunction with the drawings, wherein same or similar reference numerals in the drawings are used to indicate the same or similar components. The drawings together with the detailed description below are incorporated in the specification and form a part of the specification, and are used to further illustrate preferable embodiments of the invention and explain the principle and advantages of the invention. In the drawings.

DETAILED DESCRIPTION

Figure 1:
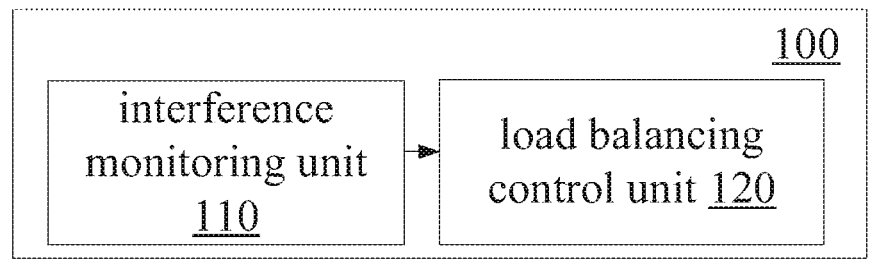
FIG. 1 is a block diagram showing a configuration example of a device for load balancing in a wireless communication system according to an embodiment of the invention.

In the following, embodiments of the invention will be described in conjunction with the drawings. Elements and features depicted in one drawing or embodiment of the disclosure may be combined with elements and features depicted in one or more other drawings or embodiments. It should be noted that, for clarity, representations and descriptions for parts and processing which are irrelevant to the invention and known by those skilled in the art are omitted in the drawings and the specification.

As shown in FIG. 1, a device 100 for load balancing in a wireless communication system according to an embodiment of the invention includes an interference monitoring unit 110 and a load balancing control unit 120. The interference monitoring unit 110 is configured to monitor interference between small cells caused by a load balancing process. The load balancing control unit 120 is configured to adjust the load balancing process based on the interference between the small cells monitored by the interference monitoring unit 110.

The device for load balancing according to the embodiment of the invention may be provided in a small base station, a macro base station or a core network entity.

A load balancing process corresponds to a process in which a traffic load is switched from a cell (i.e. an unloading source cell) to be undertaken by another cell (i.e. an unloading target cell) in a wireless communication system. The unloading source cell and the unloading target cell may include a macro cell or a small cell. The embodiment of the invention is particularly directed to an unloading process from a macro cell to a small cell and an unloading process between small cells which can cause an increment of interference within a small cell.

The unloading source cell and the unloading target cell in the load balancing process may be determined in multiple manners based on the traffic load of the macro cell or the small cell. In an embodiment of the invention, the unloading source cell or the unloading target cell in the load balancing process is determined based on a comparison of a traffic load volume of a managed small cell with an average traffic load volume of a small cell cluster where the small cell is located. In addition, according to an embodiment of the invention, the unloading source cell and the unloading target cell may also be determined in consideration of a Quality of Sendee requirement for a traffic load.

Traffic loads having different Quality of Service requirements are described briefly below.

Generally, resources in a cell can be roughly classified into signaling resource block (SRB), Guaranteed Bit Rate (GBR) traffic, non Guaranteed Bit Rate (non GBR) traffic and the like. In a traditional load balancing process, a load balancing target is determined by acquiring an occupancy rate of resource blocks of an adjacent cell. However, this manner is not optimal since the Quality of Service requirement for the traffic load is not considered.

For example, in a case that a large portion of resource blocks of a cell are used for non-GBR traffic and resources of the cell are only provided to a few users performing non-GBR traffic, some resources of the cell may be used for load balancing even if the occupancy rate of the resource blocks of the cell is high (for example, a lot of non-GBR traffic resource blocks are allocated to the users to allow them to download rapidly). Especially, for the users performing non-GBR traffic, a portion of the resources occupied by these users may be released for undertaking a load. In this case, the resources occupied by the users may be reduced without affecting service satisfaction. On the other hand, for example, in a possible case that a certain proportion of idle resources of a cell can not be actually used for load balancing due to some specific reasons, such as some resource blocks are reserved for a burst of high data volume, a high calling rate and the like, it cannot be accurately determined whether or not a load balancing should be performed, merely based on the occupancy rate of resource blocks.

Figure 2:
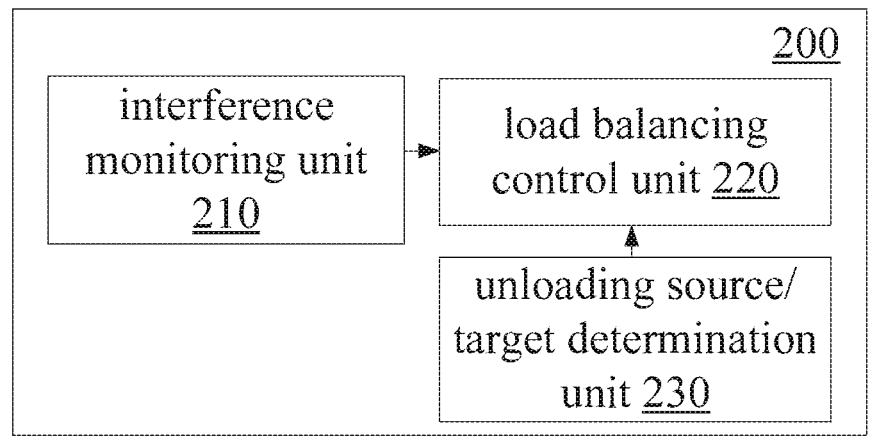
FIG. 2 is a block diagram showing a configuration example of a device for load balancing in a wireless communication system according to another embodiment of the invention.

As shown in FIG. 2, a device 200 for load balancing according to an embodiment of the invention includes an interference monitoring unit 210, a load balancing control unit 220 and an unloading source/target determination unit 230. Configurations of the interference monitoring unit 210 and the load balancing control unit 220 are similar to those of the interference monitoring unit 110 and the load balancing control unit 120 described with reference to FIG. 1, respectively, which are not be described in detail herein.

However, the device for load balancing according to the embodiment of the invention may only include the unloading source/target determination unit and not include the interference monitoring unit and the load balancing control unit. That is, the embodiments of the invention also include a device particularly for determining an unloading source cell and an unloading target cell in a load balancing process.

The unloading source/target determination unit 230 is configured to determine the unloading source cell and/or the unloading target cell in a load balancing process based on a traffic load volume of one or more small cells managed by the device 200 and an average traffic load volume calculated for a small cell cluster including multiple adjacent small cells.

In addition, the unloading source/target determination unit 230 is further configured to determine the unloading source cell and/or the unloading target cell based on Quality of Service requirements of different traffic loads. As will be described in detail later, the unloading source/target determination unit 230 may determine the unloading source cell and/or the unloading target cell in the load balancing process based on a proportion R of resource blocks occupied by GBR traffic and/or the number R' of resource blocks of non-GBR traffic allocable to a user. Unloading sources and unloading targets for a GBR traffic and for a non-GBR traffic may be determined respectively based on the loads of the GBR traffic and the non-GBR traffic. Alternatively, the above determination can also be made by comprehensively considering loads of different types of traffics.

In a case that the load balancing device according to the invention including the unloading source/target determination unit 230 is used for collectively managing multiple small cells, for example, in a case that the load balancing device is provided in a core network or a macro base station side, the load balancing device determines unloading source cells and/or unloading target cells from the multiple small cells, and transmits related information to each of the small cells, so that each of the small cells knows whether itself and/or another small cell is the unloading source cell or the unloading target cell, and therefore a proper load balancing process can be performed directly, to reduce operations between the small cells such as an interactive confirmation before unloading.

A specific embodiment is described below, in which an unloading source cell and/or an unloading target cell in a load balancing process are/is determined based on the proportion R of resource blocks occupied by GBR traffic and the number R' of resource blocks of non GBR traffic which are allocable to a user. The unloading source/target determination unit 230 may determine an unloading source cell and an unloading target cell in a load balancing process for GBR traffic based on the proportion R of resource blocks occupied by GBR traffic. In addition, the unloading source/target determination unit 230 may determine an unloading source cell and an unloading target cell in a load balancing process for non-GBR traffic based on the number R' of resource blocks of non-GBR traffic which are allocable to a user.

The proportion R and the number R' may be calculated for a small cell cluster including multiple adjacent small cells, to determine a threshold for a corresponding load balancing process between the small cells in the small cell cluster. Any one of the multiple adjacent small cells is adjacent to at least one other small cell of the multiple adjacent small cells, such that load balancing can be directly or indirectly (via one or more small cells in the small cell cluster) performed between the small cells in the small cell cluster. In an ideal case, an optimal resource configuration for a whole small cell cluster can be achieved by the load balancing process. The inventor of the invention determines a load balancing threshold for each of the small cells in the small cell cluster in consideration of the average resource occupancy and/or allocable resources of the whole small cell cluster, while different small cell clusters may have different load balancing thresholds, which depends on resource condition in each small cell cluster. Such configuration is helpful for achieving reasonable load balancing, and reducing the number of user switchings caused by the load balancing process. For the proportion R of resource blocks occupied by GBR traffic, for example, the unloading source/target determination unit 230 may acquire (for example, may acquire in a way that small base stations in the small cell cluster reports loads to a macro base station in a case that the device 200 is provided in macro base station side; may acquire in a way that the small base stations in the small cell cluster communicates with each other or communicates with the macro base station in a case that the device 200 is provided in small base station side: or may acquire via report from the small base stations in the small cell cluster or via the macro base station, in a case that the device 200 is provided in core network side) the total number of resource blocks occupied by SRBs and GBRs of all the small cells in the small cell cluster and the total number of available physical resource blocks of the small cell cluster, and calculate the proportion R by the following formula (1):

$$R = \frac{\sum (SRB_i + GBR_i)}{\sum PRB_i} \times 100\% \quad (1)$$

where $SRB_i$ is the number of resource blocks allocated to SRB by the i-th cell, $GBR_i$ is the number of resource blocks allocated to GBR traffic by the i-th cell, and $PRB_i$ is the total number of physical resource blocks of the i-th cell. In the example, the resource blocks occupied by SRB are taken into account when calculating the proportion of resource blocks occupied by GBR traffic, because a signaling is very important for a communication system and is a signal whose quality needs to be guaranteed as the GBR traffic, the proportion R calculated according to the example can better reflect a load of an important traffic in a small cell. It can be appreciated by those skilled in the art that, in other instances, the SRB may be not included in the proportion of resource blocks occupied by GBR traffic, for example, in consideration of the small number of resource blocks occupied by SRB.

Correspondingly, the unloading source/target determination unit 230 may calculate a proportion $R_i$ of each small cell in the small cell cluster by the formula (1a):

$$R_i = \frac{SRB_i + GBR_i}{PRB_i} \times 100\% \quad (1a)$$

Where $SRB_i$ is the number of resource blocks allocated for SRB by the i-th cell, $GBR_i$ is the number resource blocks allocated for GBR traffic by the i-th cell, and $PRB_i$ is the total number of physical resource blocks of the i-th cell. Similarly, it may be appreciated by those skilled in the art that, in other instances, the SRB may be not included in the proportion of resource blocks occupied by GBR traffic.

For the number R' of resource blocks for non-GBR traffic which are allocable to a user, for example, the unloading source/target unit 230 may acquire the total number of PRBs occupied by non-GBR traffic of all small cells in a small cell cluster, the total number of idle PRBs allocable for non GBR traffic and the total number of users performing non GBR traffic in the small cell cluster, and calculate R' by the following formula (2):

$$R' = \frac{\sum (PRB_i - SRB_i - GBR_i - PBR_i')}{\sum UE_i} \quad (2)$$

Where $PRB_i - SRB_i - GBR_i - PBR_i'$ represents the number of resource blocks for non-GBR or the number of allocable idle resource blocks in the i-th small cell, $PBR_i'$ represents the number of reserved resource blocks in the i-th small cell, and $UE_i$ is the number of users using non-GBR traffic in the i-th small cell.

Correspondingly, the unloading source/target determination unit 230 may calculate, for each small cell in the small cell cluster, the number $R_i'$ of resource blocks for non-GBR traffic allocable to a user in each small cell, for example, by formula (2a):

$$R'_i = \frac{PRB_i - SRB_i - GBR_i - PBR'_i}{UE_i} \quad (2a)$$

Where $PRB_i-SRB_i-GBR_i-PBR_i'$ represents the number of resource blocks for non-GBR or the number of allocable idle resource blocks in the i-th small cell, $PBR_i'$ represents the number of reserved resource blocks in the i-th small cell, and $UE_i$ is the number of users using non-GBR traffic in the i-th small cell.

The proportion R or the number R' described above are only examples of an indicator for reflecting load condition, and those skilled in the art may conceive of other indicators to measure load conditions of different traffics. Also, the invention is not limited to determining the unloading source cell and the unloading target cell for the load balancing in the above ways. For example, the number of reserved resource blocks may be not considered in the number R' of resource blocks for non-GBR traffic allocable to a user, The unloading source/target determination unit 230 may determine an unloading source cell and an unloading target cell for load balancing by comparing the proportion $R_i$ or the number $R_i'$ of the small cell described above with a corresponding proportion R or number R' (as thresholds) of the small cell cluster. For example, a small cell having a load level higher than a threshold may be determined as the unloading source cell, and a small cell having a load level lower than the threshold may be determined as the unloading target cell.

Moreover, according to an embodiment, the unloading source/target determination unit may be configured to introduce a predetermined hysteresis amount into the threshold for the load balancing process for GBR traffic and non-GBR traffic, to determine the unloading source cell and the unloading target cell, so as to avoid a ping-pong effect between the unloading source cell and the unloading target cell.

The ping-pong effect is described briefly below. For a traditional load balancing behavior, for example, in a scenario where small cells are deployed densely, a ping-pong effect may be resulted when multiple small cells select a same small cell to perform unloading. For example, in a case that small cell A and small cell B both select to unload to small cell C, which may cause small cell C to be overloaded, and then small cell C may unload to small cells A and B. Such ping-pong effect may result in a waste of system resource.

Figure 3:
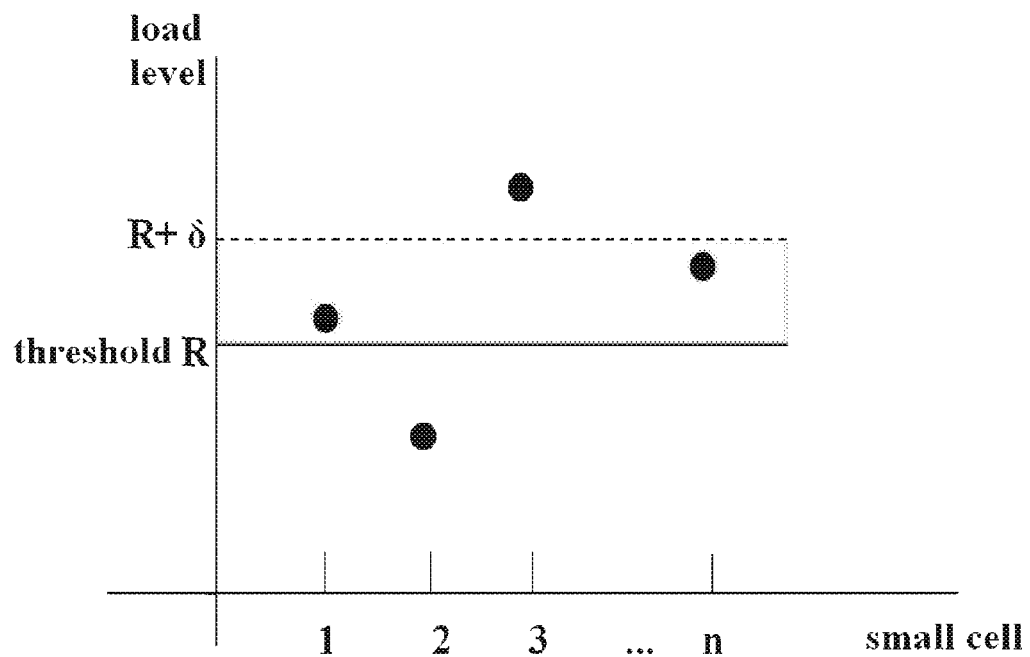
FIG. 3 is a schematic diagram for illustrating an example of determination of an unloading source/target in a load balancing process.

In the embodiment of the invention, the ping-pong effect described above may be avoided by introducing the hysteresis amounts into the threshold for the load balancing process. For example, as shown in FIG. 3, in a case that a small cell cluster includes small cells 1 to n, and a proportion R of resource blocks occupied by GBR traffic in the small cell cluster is calculated, a small cell having a proportion value of resource blocks occupied by GBR traffic less than R (for example, the small cell 2 in FIG. 3) may be determined as a low-load small cell (i.e. a small cell which can serve as an unloading target), and a small cell having a proportion value of resource blocks occupied by GBR traffic larger than R+δ (for example, the small cell 3 in FIG. 3) may be determined as a high load small cell (i.e. a small cell which can serve as an unloading source), and a small cell having a proportion value of resource blocks occupied by GBR traffic between R and R+δ (for example, the small cells 1 and n in FIG. 3) may be determined as a normal load small cell (i.e. a small cell serves as neither the unloading source nor the unloading target).

For another example, assuming that a small cell cluster includes small cells 1 to n, and the average number R' of resource blocks for non-GBR traffic allocable to each user in the small cell cluster is calculated, a small cell having the number of resource blocks for non-GBR traffic allocable to each user less than R' may be determined as a low resource small cell (i.e. a small cell that can serve as an unloading source), a small cell having the number of resource blocks for non-GBR traffic allocatable to each user larger than R'+δ' may be determined as a high resource small cell (i.e. a small cell that can serve as an unloading target), and a small cell having the number of resource blocks for non-GBR traffic allocable to each user between R' to R'+δ' may be determined as a normal resource small cell (i.e. a small cell that serves as neither the unloading source nor the unloading target).

Apparently, the invention is not limited to setting the thresholds as in the above examples. For example, the high load small cell and the low load small cell may be determined based on R and R+δ as above, or may be determined based on R−δ and R or based on R−δ and R+δ.

It should be noted that, in the above examples, the proportion R and the number R' are separately used to determine the unloading source and the target small cells for GBR traffic and for non-GBR traffic, respectively. In an embodiment of the invention, when it is determined based on the proportion R that a small cell is a high load small cell for GBR traffic, the priority of the GBR traffic is higher than that of the non-GBR traffic as the Quality of Service of the GBR traffic needs to be guaranteed, then it may be directly determined that the small cell cannot serve as an unloading target cell for neither of the GBR traffic and the non-GBR traffic. In another embodiment of the invention, the unloading source cell and/or the unloading target cell applicable for both the GBR traffic and the non-GBR traffic are determined based on a combination of the proportion R and the number R'. Specifically, a small cell having a proportion of resource blocks occupied by GBR traffic larger than R+δ is determined as the unloading source small cell, and a small cell having a proportion of resource blocks occupied GBR traffic less than R is determined as a candidate unloading target small cell. A small cell, in the candidate unloading target small cell, having the average number of resource blocks for non-GBR traffic allocable to each user larger than R' is determined as the unloading target small cell, and the unloading target small cell may accept both an unloaded GBR and a non-GBR traffic load. By determining the unloading target small cell according to the embodiment, it can be directly determined whether a traffic load is acceptable without firstly determining which type the traffic load belongs to. Similarly, those skilled in the art may determine the unloading source small cell and the unloading target small cell by combining the proportion R and the number R' in other manners or combining with other conditions in the art, according to the embodiments of the invention, which are not exemplified here for conciseness.

In addition to introducing the hysteresis amounts to the thresholds for triggering, the ping-pong effect can also be avoided by introducing a hysteresis time into an unloading process for load balancing. For example, switching is not performed immediately after determining that a load balancing condition is met, but is performed in a case that the load balancing condition is still met after a predetermined hysteresis time. Therefore, the ping-pong effect can be further avoided.

Moreover, in a case that unloading is performed from a macro cell to a small cell, the load balancing process may also be adjusted based on an overall load condition of a small cell cluster, instead of based on a load of the small cell. According to an embodiment, the load balancing control unit may be configured such that, for a small cell cluster having the proportion R described above larger than a predetermined threshold value, the unloading from the macro cell to the small cell is not performed on a small cell in the cluster. That is to say, in a case that a small cell cluster, as a whole, reaches a certain load level, no unloading process is to be performed thereon, to avoid the load level of the small cell cluster being too high.

Next, a specific example of a device for load balancing according to an embodiment of the invention is described.

According to an embodiment, an interference monitoring unit is configured to monitor interference on an adjacent small cell of an unloading target cell in an unloading process from an unloading source cell to the unloading target cell. And a load balancing control unit is configured to adjust the unloading process based on a monitoring result of the interference monitoring unit. The unloading from the unloading source cell to the unloading target cell may include an unloading from a macro cell to a small cell or an unloading between small cells.

For a balancing process for the unloading from the macro cell to the small cell, the interference monitoring unit may be configured to monitor interference on an adjacent small cell of the unloading target cell in the unloading process from the macro cell to the small cell. And the load balancing control unit may be configured to determine whether to continue a subsequent unloading process based on a monitoring result of the interference monitoring unit.

In the unloading process from the macro cell to the small cell, users to be unloaded may be grouped into multiple parts, and can be unloaded in batches. Interference within a small cell may be changed after each unloading, and the interference monitoring unit may detect the interference.

For example, in a case that the device for load balancing according to the embodiment of the invention is provided in macro base station side, the interference within a small cell may be monitored in the following manners: the macro base station is connected (for example, via an optical fiber) to small cells, to directly monitor the interference within the small cells; or the small cells may report the interferences to the macro base station, to enable the macro base station to monitor the interference within the small cell. However, the invention is not limited to the specific manners.

In a case that the unloading is performed in batches, each unloading does not necessarily result in a large change in overall spectral efficiency level within a small cell, and there may be the following cases:

1) Interferences on only a few of users within a small cell exceed a predetermined level, for example, a Reference Signal Received Quality (RSRQ) is lower than a threshold value while a overall spectral efficiency of the small cell is not changed greatly. In this case, only the users which are interfered seriously may be switched.

2) A the overall interference level of the small cell exceeds a predetermined level, for example, the spectral efficiency of the small cell is reduced to a certain threshold value, or the number of users in the small cell on which interferences exceed a predetermined level (for example, RSRQ is less than the threshold value) reaches a predetermined number, which indicates that the cell as a whole is interfered seriously. In a case that such a cell which is interfered seriously exists, it can be known that which cells around the interfered cell are previous unloading target cells, and these cells no longer serve as a target cell. In addition, a proper processing can be performed on users which are interfered seriously.

Correspondingly, according to an embodiment, the load balancing control unit may be configured to, in a case that interference caused by the unloading on an adjacent small cell of the unloading target small cell exceeds a predetermined level, switch a user, whose unloading caused the interference, back to the macro cell and no longer take the user as the unloading object in a subsequent unloading process.

According to another specific embodiment, the interference monitoring unit may be configured to monitor a spectral efficiency of an adjacent small cell with respect to an unloading target cell or the number of users in the adjacent small cell having a Reference Signal Reception Quality lower than a predetermined level caused by the unloading to the unloading target cell. And the load balancing control unit may be configured to no longer take the unloading target cell as an unloading target cell in a subsequent load balancing process in a case that the spectral efficiency of the adjacent small cell is less than a predetermined threshold value or the number of users in the adjacent small cell having Reference Signal Reception Qualities lower than the predetermined level reaches a predetermined number. The method for calculating the spectral efficiency of the small cell is well known in the art, and is not described in detail herein.

In an unloading process from a macro cell to a small cell, since a user can, for example, select an unloading target cell based on RSRQ, the user generally will not be interfered seriously in the target small cell. Therefore, interference on the adjacent small cell of the target cell caused by an increased load of the target cell is mainly considered in the unloading process from a macro cell to a small cell.

In contrast, the following types of interferences may exist in a load balancing process between small cells: interference on an unloading object user from an unloading source cell after the unloading object user is unloaded to an unloading target cell; and interference on an adjacent small cell with respect to the unloading target cell caused by an increased load of the unloading target cell.

Therefore, according to an embodiment of the invention, the interference monitoring unit may be configured to monitor the interference on the unloading object user from the unloading source cell after the unloading object user is unloaded to the unloading target cell; in addition, the interference monitoring unit may be configured to monitor the interference on the adjacent small cell with respect to the unloading target cell from the unloading target cell caused by the unloading to the unloading target cell. Correspondingly, the load balancing unit may be configured to adjust the unloading process based on the monitoring result.

According to a specific embodiment, the load balancing control unit is configured to notify the unloading source cell to gradually reduce power with a predetermined step size in a case that the interference on the unloading object user from the unloading source cell exceeds a predetermined level after the unloading object user is unloaded to the unloading target cell, to decrease interference on the unloading object user. With the above configuration, the interference from the unloading source cell on the user unloaded to the unloading target cell can be decreased.

According to another specific embodiment, the load balancing control unit is configured to, in a case that interference on an adjacent small cell with respect to an unloading target cell caused by an increased load of the unloading target cell exceeds a predetermined level after an unloading object user is unloaded to the unloading target cell, switch an interfered user of the adjacent small cell to the unloading target cell and gradually reduce power of the adjacent small cell with a predetermined step size. With the above configuration, the interference on the adjacent small cell with respect to the unloading target cell caused by the increased load of the unloading target cell can be decreased.

As described above, the embodiment is mainly directed to a case that the interferences on only a few of users within the interfered adjacent small cell exceed the predetermined level while the overall spectral efficiency of the small cell is not changed greatly. In this case, only users which are interfered seriously may be switched.

In a case that a overall interference level of the adjacent small cell with respect to the unloading target cell exceeds the predetermined level seriously, the load balancing control unit may be configured to no longer take the unloading target cell as an unloading target in a case that the spectral efficiency of the adjacent small cell with respect to the unloading target cell is lower than a predetermined threshold value or the number of users within the adjacent small cell having Reference Signal Reception Qualities lower than a predetermined level reaches a predetermined number caused by the unloading to the unloading target cell.

Further, in a case that an adjacent small cell with respect to a small cell to be unloaded does not meet a condition for an unloading target cell (for example, a load level is higher than a predetermined threshold), the load balancing control unit may control to unload the user to a macro cell and then unload the user from the macro cell to another small cell meeting the condition for the unloading target cell.

Alternatively, unloading may be performed on an adjacent small cell with respect to the adjacent small cell by a multi-hop balancing. For example, in a case that a small cell needs to be unloaded and none of adjacent small cells with respect to the small cell can accept a user to be unloaded since none of the adjacent small cells is of light load, the load balancing control unit may control to perform the unloading by a multi-hop switching. For example, the user to be unloaded is switched to an adjacent small cell with respect to the small cell, and a user in the adjacent small cell is switched to an adjacent small cell thereof. The specific process of a multi-hop switching is well known in the art and is not described in detail herein.

Figure 4:
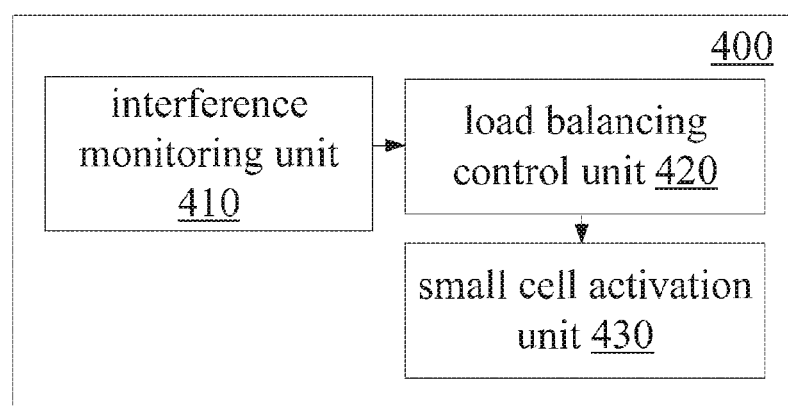
FIG. 4 is a block diagram showing a configuration example of a device for load balancing in a wireless communication system according to yet another embodiment of the invention.

In addition, in a case that a deactivated small cell exists, the deactivated small cell may be activated as required to assist in a load balancing process. As shown in FIG. 4, according to an embodiment of the invention, a device 400 for load balancing includes an interference monitoring unit 410, a load balancing control unit 420 and a small cell activation unit 430. Configurations of the interference monitoring unit 410 and the load balancing control unit 420 are similar to the configurations of the interference monitoring unit and load balancing control unit described above, respectively, which are not described in detail here. The small cell activation unit 430 is configured to, in a case that an adjacent small cell with respect to a small cell on which the unloading is to be performed does not meet the condition for the unloading target cell and a deactivated small cell exists around the small cell, activate the deactivated small cell.

In addition, for example, in a case that load balancing is performed by a multi-hop process as described above, if the multi-hop switching needs to be performed through a deactivated small cell, the deactivated small cell can be activated by the small cell activation unit.

Alternatively, the load balancing device may acquire load condition of an adjacent small cell with respect to the deactivated small cell, and can indicate the deactivated small cell to transmit a signal (such as a Channel State Information Reference Signal (CSI-RS), a Primary Synchronization Sequence (PSS) and a Secondary Synchronization Sequence (SSS)) in a case that a small cell having a heavy load exists among the adjacent small cells with respect to the deactivated small cell. The deactivated small cell is activated in a case that the number of users having strength of signals described above higher than a certain threshold value in the small cell having the heavy load is higher than a certain threshold.

Correspondingly, according to an embodiment of the invention, the small cell activation unit may be configured to activate the deactivated small cell in a case that the number of users in the small cell to be unloaded capable of detecting a signal of the deactivated small cell reaches a predetermined number.

Obviously, some processing or methods are also disclosed in the above descriptions for devices for load balancing according to embodiments of the invention. In the following, overviews of the methods are given without repeating some details discussed above. However, it should be noted that, although the methods are disclosed in the descriptions of devices for load balancing, the methods are not necessarily performed by the above components.

Figure 5:
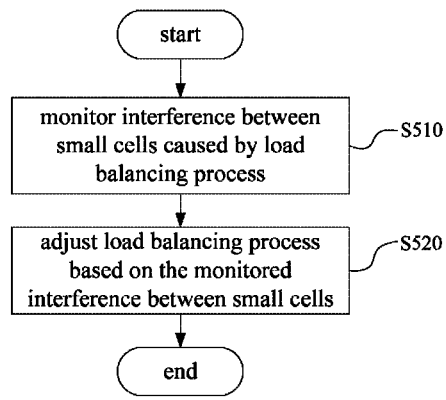
FIG. 5 is a flowchart showing a process example of a method for load balancing in a wireless communication system according to an embodiment of the invention.

As shown in FIG. 5, a method for load balancing in a wireless communication system according to an embodiment of the invention includes: monitoring interference between small cells caused by a load balancing process (S510) and adjusting the load balancing process based on the monitored interference between the small cells (S520).

As described above, the load balancing process corresponds to a process in which a traffic load of an unloading source cell is changed to be undertaken by an unloading target cell, including an unloading process from a macro cell to a small cell and/or an unloading process between small cells.

The load balancing method according to the embodiment of the invention may be performed by a logical functional entity provided in a macro base station, a small base station or a core network entity.

In addition, the load balancing process may be triggered in multiple ways based on a traffic load of a macro cell or a small cell.

Figure 6:
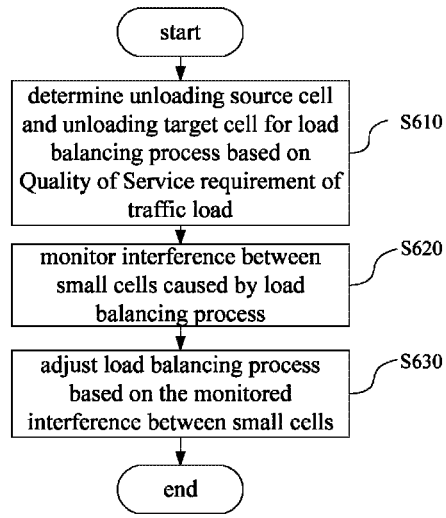
FIG. 6 is a flowchart showing a process example of a method for load balancing in a wireless communication system according to another embodiment of the invention.

As shown in FIG. 6, according to an embodiment of the invention, an unloading source cell and an unloading target cell for a load balancing process are determined in consideration of a Quality of Service requirement of a traffic load (610). For example, an unloading source cell and an unloading target cell may be determined for a GBR traffic and a non-GBR traffic, respectively, as described above. Steps S620 and S630 in FIG. 6 are similar to steps S510 and S520 in FIG. 5, respectively, and are not described here in detail.

In the following, the following process example in a method for load balancing according to an embodiment of the inventions is described in conjunction with FIG. 7 and FIGS. 8A to 8C: monitoring interference on an adjacent small cell with respect to an unloading target cell in an unloading process from an unloading source cell to the unloading target cell; and adjust the unloading process based on a monitoring result.

Figure 7:
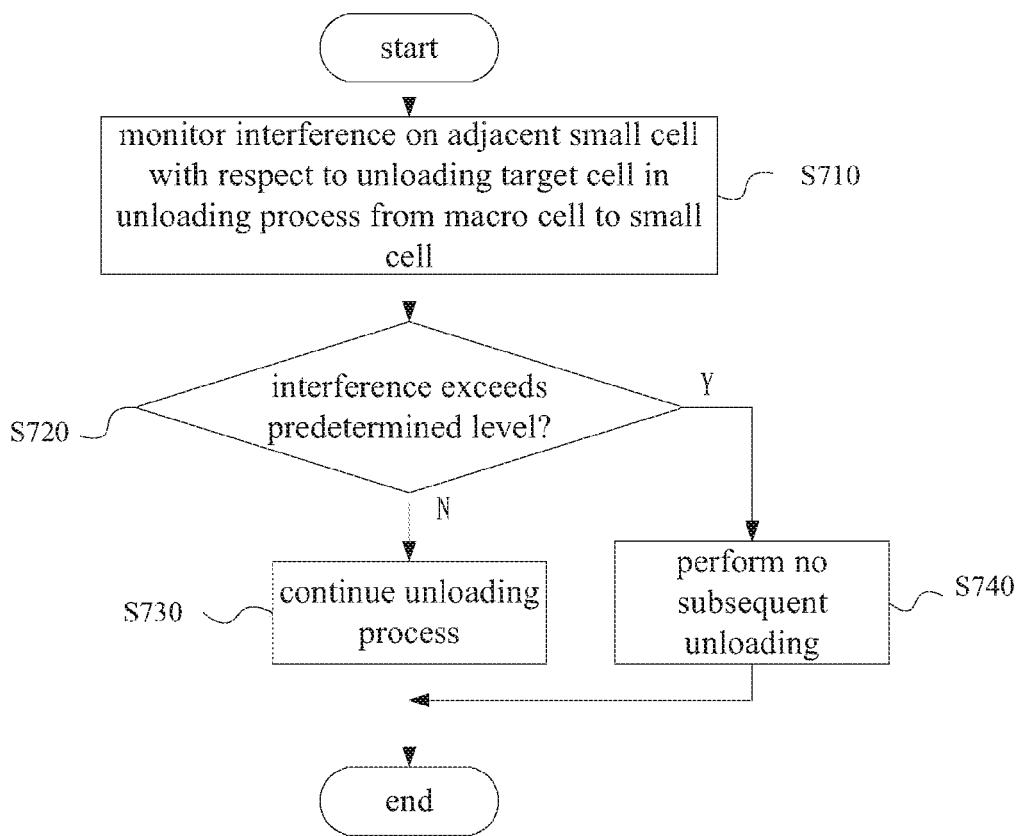
FIG. 7 is a flowchart showing a process example of a method for load balancing in a wireless communication system according to yet another embodiment of the invention.

As shown in FIG. 7, for a load balancing process for unloading from the macro cell to the small cell, in step S710, interference on an adjacent small cell with respect to an unloading target cell in an unloading process from the macro cell to the small cell is monitored. In step S720, it is determined whether the monitored interference exceeds a predetermined level (for example, in a case that unloading object users are unloaded in batches, it is determined, after unloading for a batch, whether the monitored interference exceeds a predetermined level). In a case that the interference does not exceed the predetermined level (N in S720), the unloading process is performed in step S730 (for example, users of a subsequent batch are unloaded). In a case that the interference exceeds the predetermined level (N in S720), no subsequent unloading is performed (S740).

As described above, the interference caused by the unloading process includes the following cases: interferences on only a few of users in a small cell exceed a predetermined level while a overall spectral efficiency of the small cell is not changed greatly; and a overall interference on the small cell exceeds the predetermined level (for example, the spectral efficiency of the small cell is reduced to a certain threshold value or the number of users within the small cell on which interferences exceed the predetermined level reaches a predetermined number). In the method for load balancing according to the embodiment of the invention, the load balancing process may be adjusted based on different cases described above.

Figure 8A:
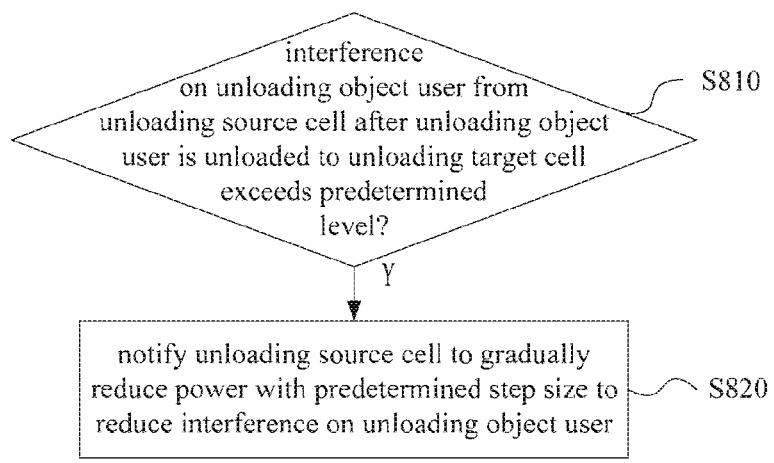
FIGS. 8A to 8C are flowcharts showing process examples in a method for load balancing in a wireless communication system according to an embodiment of the invention.
Figure 8B:
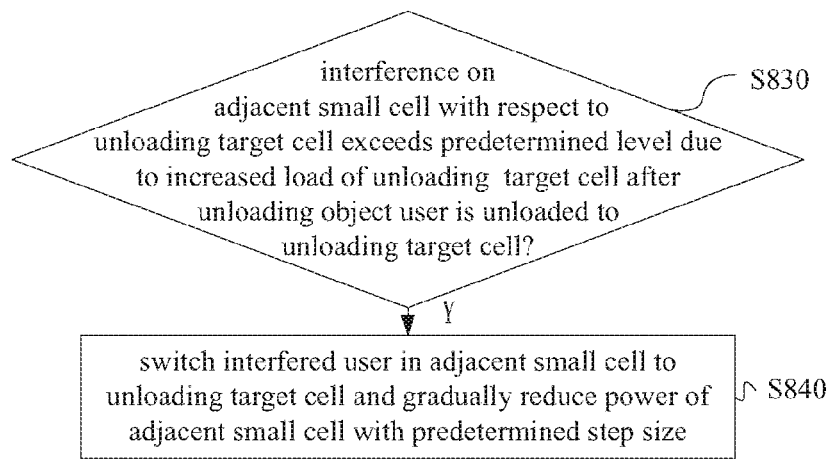
Figure 8C:
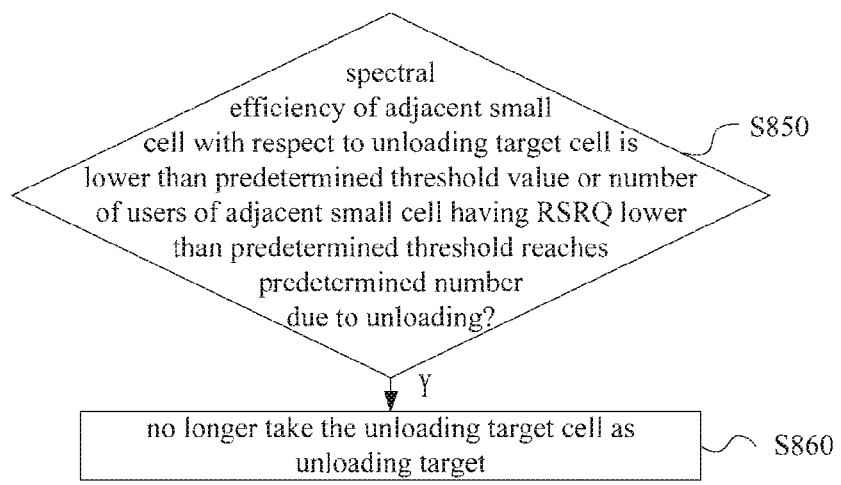

For an unloading process between small cells, as shown in FIGS. 8A to 8C, interference on an unloading object user from an unloading source cell after the unloading object user is unloaded to an unloading target cell can be monitored (as shown by S810 in FIG. 8A) and interference on an adjacent small cell with respect to the unloading target cell from the unloading target cell caused by the unloading to the unloading target cell can be monitored (as shown by S830 in FIG. 8B and S850 in FIG. 8C).

Specifically, as shown in FIG. 8A, in a case that the interference on the unloading object user from the unloading source cell exceeds a predetermined level after the unloading object user is unloaded to the unloading target cell (Y in S810), then the unloading source cell is notified of gradually reducing power with a predetermined step size in step S820, to decrease the interference on the unloading object user.

As shown in FIG. 8B, in a case that interference on an adjacent small cell with respect to the unloading target cell caused by an increased load of the unloading target small cell exceeds a predetermined level after the unloading object user is unloaded to the unloading target cell (Y in S830), then an interfered user in the adjacent small cell is switched into the unloading target cell and the power of the adjacent small cell is reduced gradually with a predetermined step size in step S840. The above process can be directed to a case that interference on only a few of users in the interfered small cell exceeds the predetermined level while the overall spectral efficiency of the small cell is not changed greatly, As shown in FIG. 8C, in a case that, because of the unloading, a spectral efficiency of an adjacent small cell with respect to an unloading target cell is less than a predetermined threshold value, or the number of users in the adjacent small cell having Reference Signal Reception Qualities lower than a predetermined level reaches a predetermined number (Y in S850), the unloading target cell is no longer taken as an unloading target in step S860. The above process can be directed to a case that a overall interference of an interfered small cell exceeds a predetermined level.

Figure 9:
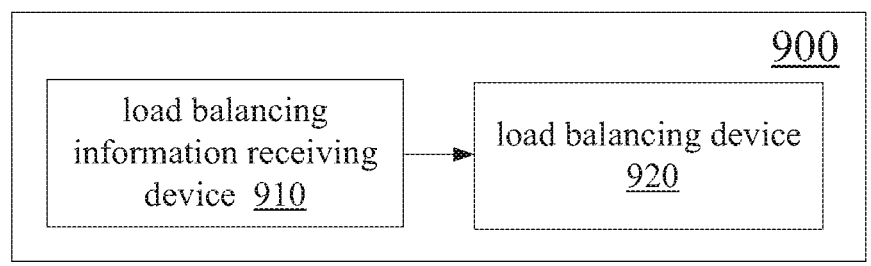
FIG. 9 is a block diagram showing a configuration example of a macro base station according to an embodiment of the invention.
Figure 10:
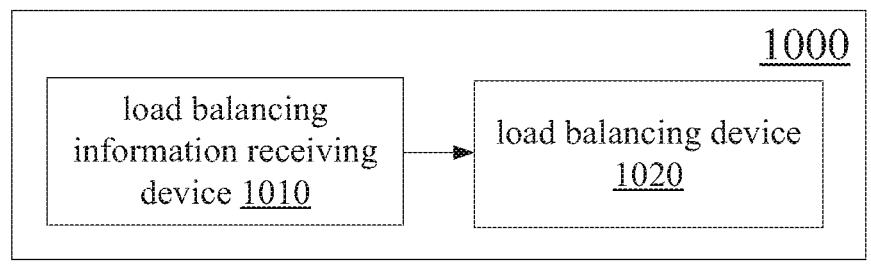
FIG. 10 is a block diagram showing a configuration example of a small base station according to an embodiment of the invention.

Next, a macro base station and a small base station according to embodiments of the invention are described in conjunction with FIGS. 9 and 10.

As shown in FIG. 9, a macro base station 900 according an embodiment of the invention includes an interference information acquisition device 910 and a load balancing device 920.

The interference information acquisition device 910 is configured to acquire inference information including information about interference on an adjacent small cell with respect to an unloading target cell caused by unloading from the macro base station 900 to a small cell.

Specifically, the interference information acquisition device 910 may directly acquire the interference information (for example, the interference on each small cell can be acquired directly by connecting to the small cell, or the interference on each small cell can be acquired by reporting the interference by the small cell), or may receive the interference information from other logical functional entity (for example, provided in other macro base station, small base station or core network entity).

The load balancing device 920 is configured to perform a load balancing process with small cells based on the interference information.

Specifically, the load balancing device 920 may directly generate a control instruction based on the acquired interference information to control the load balancing process. Alternatively, the load balancing device 920 may perform the load balancing process based on a signaling generated based on the interference information and received from other logical functional entity (for example, provided in other macro base station, small base stations or core network entity).

According to an embodiment, the load balancing device 920 may be configured to, in a case that the acquired interference information indicates that interference on an adjacent small cell with respect to the unloading target cell caused by the unloading from the macro base station 900 to the small cell exceeds a predetermined level, switch a user whose unloading causes the interference back to the macro base station 900 and no longer take the user as an unloading object in a subsequent unloading process.

According to an embodiment, the interference information acquired by the interference information acquisition device 910 includes information about a spectral efficiency of the adjacent small cell with respect to the unloading target cell, or information about the number of users in adjacent small cell with respect to the unloading target cell having Reference Signal Reception Qualities lower than a predetermined level. And the load balancing device 920 is configured to no longer take the target cell as an unloading target cell in a case that the interference information acquired by the interference information acquisition device 910 indicates that the spectral efficiency of the adjacent small cell is lower than a predetermined threshold value or the number of users in the adjacent small cell having the Reference Signal Reception Qualities lower than a predetermined level reaches a predetermined number.

As shown in FIG. 10, a small base station 1000 according to an embodiment of the invention includes an interference information acquisition device 1010 and a load balancing device 1020.

The interference information acquisition device 1010 is configured to acquire interference information including information about interference on an unloading object user from the present small cell after the unloading object user is unloaded from the present small cell to a target cell, or information about interference on the present small cell caused by an increased load of an adjacent small cell with respect to the present small cell after the adjacent small cell accepts unloading from a macro cell or another small cell.

Specifically, the interference information acquisition device 1010 may directly acquire information about interference on the present small cell. For information about interference on an adjacent small cell, the interference information acquisition device 1010 may acquire the interference on the adjacent small cell by connecting to the adjacent small cell; may acquire the interference from a macro cell in a case that the adjacent small cell reports the interference to the macro cell; or may receive the interference from other logical functional entity (for example, provided in other macro base station, small base stations or core network entity).

The load balancing device 1020 is configured to perform the load balancing process with another small cell based on the interference information acquired by the interference information acquisition device 1010.

Specifically, the load balancing device 1020 may directly generate a control instruction based on the acquired interference information to control a load balancing process; may perform the load balancing process in response to a control signaling from a macro base station; or may perform the load balancing process based on a signaling generated based on the interference information and received from other logical functional entity (for example, provided in other macro base station, small base stations or core network entity).

According to an embodiment, the load balancing device 1020 is configured to, in a case that the interference information acquired by the interference information acquisition device 1010 indicates that interference on an unloading object user from a present small cell exceeds a predetermined level after the unloading object user is unloaded from the present small cell to a target cell, cause the small base station 1000 to gradually reduce power with a predetermined step size, to decrease the interference on the unloading object user.

According to another embodiment, the load balancing device 1020 is configured to, in a case that the interference information acquired by the inference information acquisition device 1010 indicates that interference on a present small cell from an adjacent small cell with respect to the present small cell since the adjacent small cell accepts unloading excesses a predetermined level, switch an interfered user in the present small cell to the adjacent small cell and gradually reduce power of the small base station 1000 with a predetermined step size.

According to an embodiment, the interference information acquired by the interference information acquisition device 1010 includes information about a spectral efficiency of a small cell of the small base station 1000, or information about the number of users in a small cell of the small base station 1000 having Reference Signal Reception Qualities lower than a predetermined level. And the load balancing device 1020 is configured to, in a case that the interference information acquired by the interference information acquisition device 1010 indicates that since the adjacent small cell accepts the unloading, the spectral efficiency of the present small cell is lower than a predetermined threshold value or the number of user in the present small cell having Reference Signal Reception Qualities lower than a predetermined level reaches a predetermined number, no longer take the adjacent small cell as an unloading target cell.

In addition, a small base station according to an embodiment of the invention may further include an unloading source/target determination unit (not shown in the drawings), which is configured to determine whether a small cell can serve as an unloading source cell or an unloading target cell based on a traffic load volume of a small cell served by the small base station and an average traffic load volume calculated for a small cell cluster including multiple adjacent small cells. And the load balancing device may be further configured to perform a load balancing process with another small cell based on a result determined by the unloading source/target determination unit.

As an example, the steps of the above methods and the modules and/or units of the above devices may be implemented as software, firmware, hardware or a combination thereof. In a case that the steps and the modules and/or units are implemented by the software or the firmware, a program composing the software implementing the above methods may be loaded into a computer having a special-purpose hardware structure (for example, a general-purpose computer 1100 shown in FIG. 11) from a storage medium or a network, and the computer can perform various functions in a case of being loaded various programs.

Figure 11:
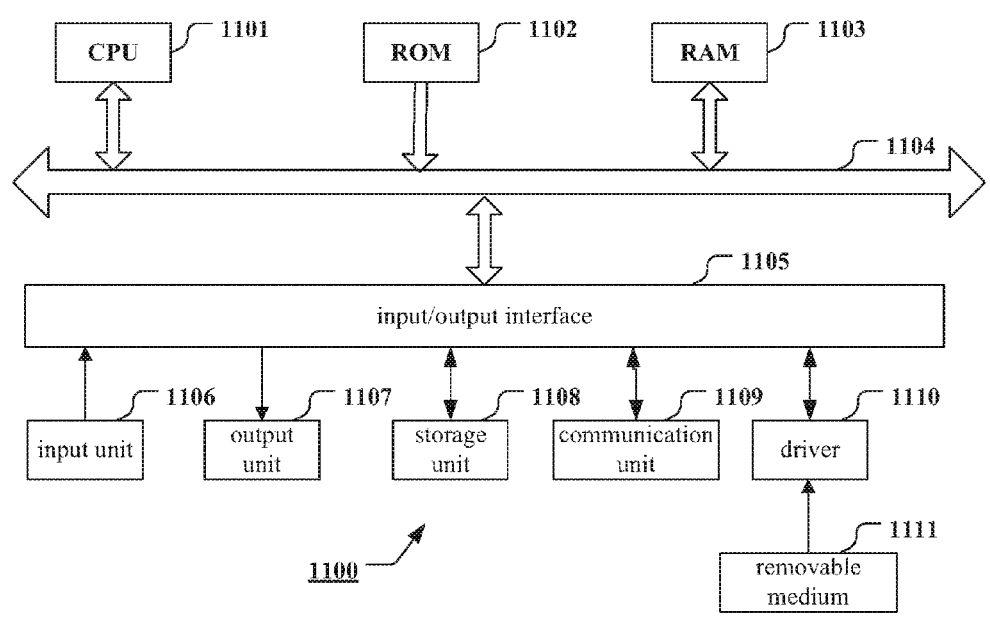
FIG. 11 is a block diagram showing an exemplary structure of a computer for implementing methods and devices according to the invention.

In FIG. 11, an computing processing unit (i.e. CPU) 1101 performs various processing in response to a program stored in a Read-Only Memory (ROM) 1102 or a program loaded from a storage unit 1108 into a Random Access Memory (RAM) 1103. Data required in various processing performed by the CPU 1101 may also be stored in the RAM 1103 as needed. The CPU 1101, the ROM 1102 and the RAM 1103 are connected to one another via a bus 1104, and an input/output interface 1105 is also connected to the bus 1104.

The following parts are connected to the input/output interface 1105: an input unit 1106 (including a keyboard, a mouse and the like), an output unit 1107 (including a display such as a cathode-ray tube (CRT) and a liquid crystal display (LCD), a speaker and the like), a storage unit 1108 (including a hard disk and the like), and a communication unit 1109 (including a network interface card such as a LAN card, a modem and the like). The communication unit 1109 performs communication processing via a network such as the Internet. A driver 1110 may also be connected to the input/output interface 1105 as needed. A removable medium 1111 such as a magnetic disk, an optical disk, a magneto-optical disk and a semiconductor memory is mounted on the driver 1110 as needed, so that a computer program read from the removable medium 1111 may be loaded into the storage unit 1108 as needed.

In a case that the above processing is implemented by software, a program composing the software are loaded from a network such as the Internet or a storage medium such as the removable medium 1111.

It should be understood by those skilled in the art that the storage medium is not limited to the removable medium 1111 shown in FIG. 11 which stores a program and is separated from a device to provide the program to a user. An example of the removable medium 1111 includes a magnetic disk (including a floppy disk (registered trademark)), an optical disk (including a Compact disc read-only memory (CD-ROM) and a Digital Versatile Disk (DVD)), a magneto-optical disk (including a Mini Disk (MD) (registered trademark)) and a semiconductor memory. Alternatively, the storage medium may be the ROM 1102, a hard disk in the storage unit 1108 and the like, which stores the program and is distributed to a user together with a device including the storage medium.

A program product storing a machine readable instruction code is further provided according to the invention. In a case that the instruction code is read and executed by a machine, the method according to the embodiments of the invention described above can be performed.

Correspondingly, a storage medium carrying the program product storing the machine readable instruction code described above is also included in the disclosure of the invention. The storage medium includes but not limited to a floppy disk, an optical disk, a magneto-optical disk, a memory card, a memory stick, and the like.

In the above descriptions of the embodiments according to the invention, features described and/or illustrated for one embodiment may be used in one or more of other embodiments in the same way or in a similar way, and may be combined with or be replaced with features in the other embodiments.

It should be emphasized that the term "comprise/include" when used herein indicates that features, elements, steps or components exist, and one or more other features, elements, steps or components may also exist or may be added.

In the above embodiments and examples, the steps and/or units are represented by reference numerals composed of a number. It should be understood by those skilled in the art that, these reference numerals are only used for description and plotting, and are not used to represent an order of the steps and/or units or other limits.

In addition, the method according to the invention is not limited to be performed according to a time order described in the specification, and may be performed according to other time orders sequentially, in parallel or independently. Therefore, the technical scope of the invention is not limited by an executing order of the method described in the specification.

While the invention has been described above by the specific embodiments of the invention, it should be understood that all embodiments and examples described above are not restrictive but illustrative. Various modifications, improvements and equivalents can be made to the invention by those skilled in the art within the scope and spirit of accompanying claims. These modifications, improvements or equivalents should fall within the scope of protection of the invention.

The invention claimed is:

1. A device for load balancing in a wireless communication system, comprising:
   circuitry configured to:
   an interference monitoring unit, configured to monitor interference between small cells caused by a load balancing process; and
   a load balancing control unit, configured to adjust the load balancing process according to the monitored interference between the small cells, wherein the load balancing process corresponds to a process in which a traffic load of an unloading source cell is changed to be undertaken by an unloading target cell, comprising an unloading process from a macro cell to a small cell and/or unloading process between small cells;
   determine the unloading source cell or the unloading target cell for the load balancing process, based on a traffic load volume of one or more small cells managed by the device and an average traffic load volume calculated for a small cell cluster comprising a plurality of adjacent small cells;
   determine the unloading source cell and/or the unloading target cell for the load balancing process based on Quality of Service requirements of different traffic loads;
   determine the unloading source cell and/or the unloading target cell for the load balancing process based on a proportion R of resource blocks occupied by a guaranteed bit rate traffic and/or a number R' of resource blocks of a non-guaranteed bit rate traffic allocable to a user;
   determine the unloading source cell and/or the unloading target cell for the load balancing process based on the proportion R of resource blocks occupied by the guaranteed bit rate traffic and/or the number R' of resource blocks of the non-guaranteed bit rate traffic allocable to a user; and
   calculate the proportion R or the number R' for the small cell cluster comprising the plurality of adjacent small cells, to determine a threshold for a load balancing process between the small cells in the small cell cluster.

2. The device according to claim 1, wherein the circuitry is further configured to introduce a predetermined hysteresis into the threshold for the load balancing process, to determine the unloading source cell and the unloading target cell, to avoid a ping-pong effect between the unloading source cell and the unloading target cell.

3. The device according to claim 1, wherein the circuitry is further configured to not perform an unloading from a macro cell to a small cell on a small cell in a small cell cluster having the proportion R greater than a predetermined threshold value.

4. The device according to claim 1, wherein the circuitry is further configured to monitor interference on an adjacent small cell with respect to the unloading target cell in an unloading process from the unloading source cell to the unloading target cell, and
   adjust the unloading process based on the monitored interference or to determine whether to perform a subsequent unloading process based on the monitored interference.

5. The device according to claim 4, wherein the circuitry is further configured to, in the case that the interference on the adjacent small cell with respect to the unloading target cell caused by the unloading is greater than a predetermined level, switch a user, the unloading for which causes the interference, back to the macro cell and no longer take the user as an unloading object in the subsequent unloading process.

6. The device according to claim 4, wherein the circuitry is further configured to monitor a spectral efficiency of the adjacent small cell with respect to the unloading target cell or a number of users in the adjacent small cell having reference signal receiving qualities lower than a predetermined level, caused by the unloading to the unloading target cell, and
   the load balancing control unit is configured to no longer take the unloading target cell as an unloading target cell in the case that the spectral efficiency of the adjacent small cell is lower than a predetermined threshold value or the number of users in the adjacent small cell having reference signal receiving qualities lower than the predetermined level reaches a predetermined number.

7. The device according to claim 4, wherein the circuitry is further configured to, for an unloading process between small cells, monitor: interference on an unloading object user from the unloading source cell after the unloading object user is unloaded to the unloading target cell; and interference on the adjacent small cell from the unloading target cell caused by the unloading to the unloading target cell.

8. The device according to claim 7, wherein the circuitry is further configured to, in the case that the interference on the unloading object user from the unloading source cell after the unloading object user is unloaded to the unloading target cell exceeds a predetermined level, notify the unloading source cell to gradually reduce power with a predetermined step size, to reduce the interference on the unloading object user.

9. The device according to claim 7, wherein the circuitry is further configured to, in the case that the interference on the adjacent small cell caused by an increased load of the unloading target cell exceeds a predetermined level after the unloading object user is unloaded to the unloading target cell and gradually reduce power of the adjacent small cell with a predetermined lined step size to decrease interference on the unloading object user.

10. The device according to claim 7, wherein the circuitry is further configured to no longer take the unloading target cell as an unloading target in the case that, due to the unloading to the unloading target cell, a spectral efficiency of the adjacent small cell with respect to the unloading target cell is lower than a predetermined threshold value or a number of users in the adjacent small cell having reference signal receiving qualities lower than a predetermined threshold reaches a predetermined number.

11. The device according to claim 7, wherein the circuitry is further configured to, in a case that an adjacent small cell with respect to a small cell to be unloaded do not meet a condition for the unloading target cell, unload the small cell to a macro cell and then unload the small cell from the macro cell to another small cell meeting the condition for the unloading target cell.

12. The device according to claim 1, wherein the circuitry is further configured to, in the case that an adjacent small cell with respect to a small cell to be unloaded do not meet a condition for the unloading target cell and a deactivated small cell exists around the small cell to be unloaded, activate the deactivated small cell.

13. The device according to claim 1, wherein the circuitry is further configured to activate a deactivated small cell in a case that a number of users, in a small cell to be unloaded, which are capable of detecting a signal of the deactivated small cell reaches a predetermined number.

14. The device according to claim 1, wherein the device is provided in a small base station, a macro base station or a core network entity.

15. A method for load balancing in a wireless communication system, the method comprising:
monitoring interference between small cells caused by a load balancing process;
adjusting the load balancing process based on the monitored interference between the small cells;
monitoring interference on an adjacent small cell with respect to a unloading target cell in an unloading process from the unloading source cell to the unloading target cell, wherein, for an unloading process between small cells, (i) interference on an unloading object user from the unloading source cell after the unloading object user is unloaded to the unloading target cell and (ii) interference on the adjacent small cell from the unloading target cell caused by the unloading to the unloading target cell are monitored;
adjusting the unloading process based on the monitored interference or determining whether to perform a subsequent unloading process based on the monitored interference; and
in the case that the interference on the unloading object user from the unloading source cell after the unloading object user is unloaded to the unloading target cell exceeds a predetermined level, notifying the unloading source cell to gradually reduce power with a predetermined step size, to reduce the interference on the unloading object user.

* * * * *